(12) United States Patent
Shaikh et al.

(10) Patent No.: US 9,118,507 B2
(45) Date of Patent: Aug. 25, 2015

(54) TECHNIQUES FOR MESSAGE WAITING INDICATION SUPPORT ACROSS DIFFERENT PROTOCOLS

(75) Inventors: Mohammed Taher Shaikh, Fremont, CA (US); Viraj Raut, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1556 days.

(21) Appl. No.: 11/448,280

(22) Filed: Jun. 7, 2006

(65) Prior Publication Data

US 2007/0286157 A1 Dec. 13, 2007

(51) Int. Cl.
*H04L 12/28* (2006.01)
*H04L 12/66* (2006.01)
*H04L 29/06* (2006.01)

(52) U.S. Cl.
CPC ............ *H04L 12/66* (2013.01); *H04L 65/1006* (2013.01); *H04L 65/1009* (2013.01); *H04L 65/1033* (2013.01); *H04L 65/1096* (2013.01)

(58) Field of Classification Search
CPC ......... H04M 1/64; H04M 3/53; H04M 3/533; H04M 3/53308; H04L 12/66; H04L 65/1006; H04L 65/1009; H04L 65/1096; H04L 65/1033
See application file for complete search history.

(56) References Cited

U.S. PATENT DOCUMENTS

| 6,842,506 | B1 | 1/2005 | Bedingfield |
| 7,010,100 | B1 | 3/2006 | Garg et al. |
| 7,020,458 | B2 | 3/2006 | Bossemeyer, Jr. et al. |
| 2001/0046234 | A1 * | 11/2001 | Agrawal et al. ............... 370/402 |
| 2005/0124325 | A1 * | 6/2005 | Chaudry et al. ............... 455/413 |
| 2006/0029195 | A1 * | 2/2006 | Mullis et al. ............... 379/88.17 |
| 2006/0083363 | A1 | 4/2006 | Bonn et al. |
| 2007/0087730 | A1 * | 4/2007 | Diroo et al. ............... 455/413 |
| 2007/0248077 | A1 * | 10/2007 | Mahle et al. ............... 370/352 |
| 2010/0054259 | A1 * | 3/2010 | Khan ............... 370/395.52 |
| 2012/0182987 | A1 * | 7/2012 | Gallant ............... 370/352 |

FOREIGN PATENT DOCUMENTS

WO 01/78347 A2 10/2001

OTHER PUBLICATIONS

ITU-T Recommendation H.450.7: Message waiting indication supplementary sevice for H.323. Series H: Audiovisual and multimedia systems. May 1999.*
Supplementary European Search Report dated Feb. 28, 2014 from corresponding European Application No. 07795833.8, 8 pages.

* cited by examiner

*Primary Examiner* — Luat Phung
(74) *Attorney, Agent, or Firm* — Parker Ibrahim & Berg LLC; James M. Behmke; Stephen D. LeBarron (57) ABSTRACT

Techniques and systems for inter-working between different protocols are disclosed. In one embodiment, a protocol inter-working system can include: (i) a first server that can connect to a first gateway, where the first server and the first gateway can operate in a first protocol; (ii) a second server that can connect to a second gateway, where the second server and the second can operate in a second protocol; and (iii) a controller that can connect to the first and second gateways, where the controller can translate a first indicator in the first protocol to a second indicator in the second protocol. The first and second protocols can include H.323 and session initiation protocol (SIP), for example. The first and second indicators can each include a message waiting indicator (MWI), for example.

9 Claims, 5 Drawing Sheets

Figure 1 (conventional)

TECHNIQUES FOR MESSAGE WAITING INDICATION SUPPORT ACROSS DIFFERENT PROTOCOLS

BACKGROUND OF THE INVENTION

Embodiments of the present invention relate in general to networking systems and, more specifically, to techniques for message waiting indicator (MWI) support across different protocols, particularly involving voice over internet protocol (VOIP) networks.

In many modern networking approaches, VOIP networks can be based on session initiation protocol (SIP) or H.323 protocols. The H.323 protocol is widely deployed in many existing networks today. Going forward, SIP is projected to be deployed in many newer networks, while also replacing existing H.323 networks. Given this transitional period of many voice networking systems, inter-working between H.323 and SIP protocols is desirable so that existing, as well as newly-developed, IP infrastructure can effectively work together. Further, because most message waiting indicator (MWI) servers are equipped to handle either SIP messages or H.323 messages, but not both, there is a need to inter-work and otherwise improve the handling of MWI messages to address this rapidly developing market.

DETAILED DESCRIPTION OF EMBODIMENTS OF THE INVENTION

Embodiments of the present invention can provide improved message waiting indicator (MWI) support, inter-working of non-call-based SIP messages from/to call-based H.323 messages, as well as an improved mapping between H.323 messages in a non-call-based SIP message from/to non-call-based H.323 messages, for example.

Advantages of embodiments of the present invention include overall simplification of H.323 MWI message handling. This approach can also reduce the call-based MWI handling in H.323 formats by converting to a non-call-based MWI handling approach. Further, system bandwidth can be saved and billing systems assisted by substantially eliminating zero duration signaling only calls in this approach. Another advantage of embodiments of the present invention involves inter-working between H.323 and SIP MWI messages whereby both non-call-based and call-based inter-working can be supported. Such an approach can increase inter-working ability between networks, protocols, and third party endpoints.

Figure 1:
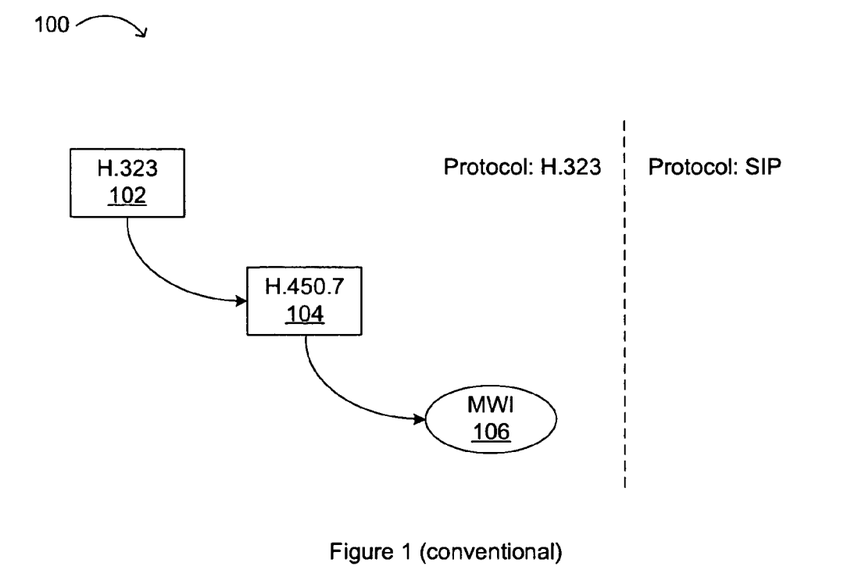
FIG. 1 depicts a conventional message waiting indication (MWI) handling for the H.323 protocol.

Referring now to FIG. 1, a conventional MWI handling for the H.323 protocol is shown and indicated by the general reference character 100. An H.323 protocol MWI approach can include H.323 (102) commands overlying H.450.7 (104) standards to give an MWI (106). However, such an approach may not be applicable to SIP type protocols, as discussed above, because two protocols may not function together for MWI passing. Such conventional approaches may in fact only handle SIP messages or H.323 messages in an MWI server. In other approaches, MWI servers and associated voicemails may be deployed behind a private branch exchange (PBX). However, such a solution is not desirable for increased inter-operability across multiple types of networks and/or systems.

Figure 2:
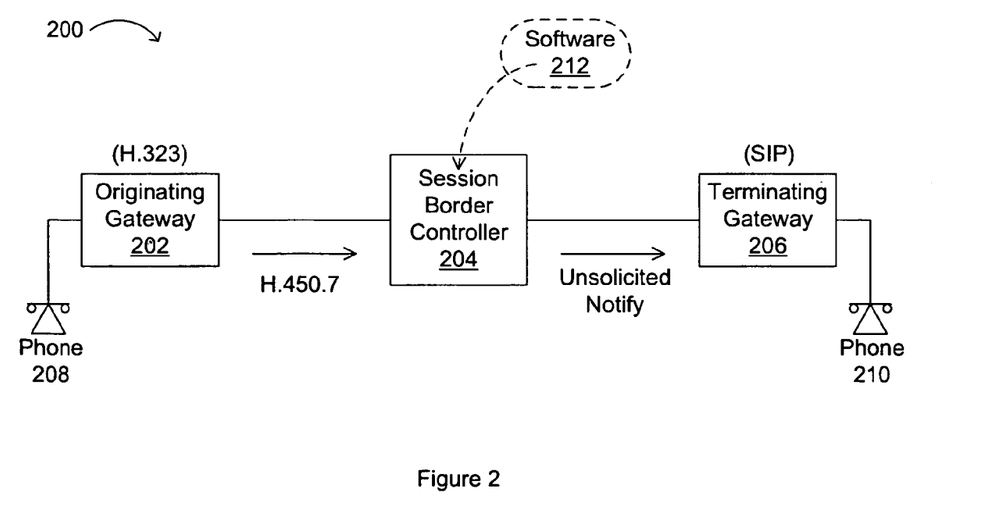
FIG. 2 depicts an exemplary inter-working between H.323 and SIP protocols in accordance with embodiments of the present invention.

Referring now to FIG. 2, an exemplary inter-working between H.323 and SIP protocols in accordance with embodiments of the present invention is shown and indicated by the general reference character 200. An originating gateway (e.g., 202) can be a router or a server that is configured to operate as a gateway, for example. In general, such gateways can be devices that may receive a teleconference protocol (e.g., on internet protocol (IP)) and convert into time-division multiplexing (TDM), connect to an IP phone, or adopt another appropriate device and/or format.

In the example of FIG. 2, phone 208 can connect to originating gateway 202. Phone 208 can be a wired telephone, a cell phone, a laptop, or any type of device capable of handling an MWI. For example, phone 208 can be any device that contains a message indication light or any other such indicator. Originating gateway 202 can be configured to recognize an H.323 protocol. H.323 is a packet-based multimedia (e.g., audio, video, and data) communications protocol, suitable for voice over internet protocol (VOIP) applications. Signal-based H.450.7 provides complementary standards for H.323, allowing MWI support for H.323 using H.450.7 standards. As such, MWI can be accommodated using H.450.7 standards, as discussed above.

Session Border Controller (SBC) 204 may be a router configured with software to operate as an SBC. Alternatively, a server or some other device could be configured as an SBC. In accordance with embodiments of the present invention, SBC 204 can be configured or loaded with software 212 such that SBC 204 can translate an MWI from an H.323 protocol into an SIP protocol. Thus, an H.450.7 standard can be received by SBC 204 and may be translated into an "Unsolicited Notify" (or a "Subscribe/SIP Notify"), which is understood in SIP for MWI. Messages that can be sent in an H.323 configuration using H.450.7 standards are "MWI Activate," "MWI Deactivate," or "Refresh," to name a few. These H.450.7 messages can be sent between a gateway (e.g., originating gateway 202 and/or terminating gateway 206) and an MWI server (not shown) that can be coupled to a gateway, for example.

In this fashion, a terminating gateway (e.g., 206) configured for SIP can receive an MWI from an originating gateway (e.g., 202) that was configured for H.323, for example. This MWI can be passed to an attached phone (e.g., 210) so that an associated user can be notified of a message waiting. Essentially, a mapping of messages when received from an MWI server to or from H.323 messages can be accomplished in real time. For example, an MWI Activate/MWI Deactivate can be mapped or translated into SIP-compatible Unsolicited Notify or Subscribe/SIP Notify messages.

Conversely, when an MWI server coupled to an originating gateway is SIP based, message mapping can be done from an endpoint configured for SIP and toward an endpoint configured for H.323. An endpoint can be any device suitable for voice and/or IP interaction (e.g., phones 208 and 210). In operation, an MWI server can send an Unsolicited Notify or Subscribe message to SBC 204, for example. SBC 204 can then originate a call to send a Setup to an H.323 endpoint. The H.323 endpoint can then send a call proceeding message to SBC 204. The H.323 endpoint can then send a connect message to SBC 204, and the SBC can translate an acknowledgment message to send to an associated MWI server. In this fashion, a non-call-based message sent by a SIP can be translated to a call-based message in H.323, or vice versa.

While only an H.323 protocol system MWI translation into an SIP protocol system is shown in FIG. 2, and a SIP conversion of an MWI into a H.323 compatible MWI has been described, one skilled in the art will recognize that other systems, protocols, and/or types of signal indications can also be implemented in accordance with embodiments of the present invention.

In one embodiment of the present invention, SBC 204 can be configured to support and to pass messages between service provider (SP) networks. Thus, one SP network having an H.323 configuration can inter-work with another SP network using SIP. In an application, SIP may be deployed in a network core, while H.323 deployments remain on the enterprise. As one skilled in the art will recognize, embodiments of the present invention can be used to translate between protocol-specific indicators (e.g., MWI) on different networks.

Figure 3:
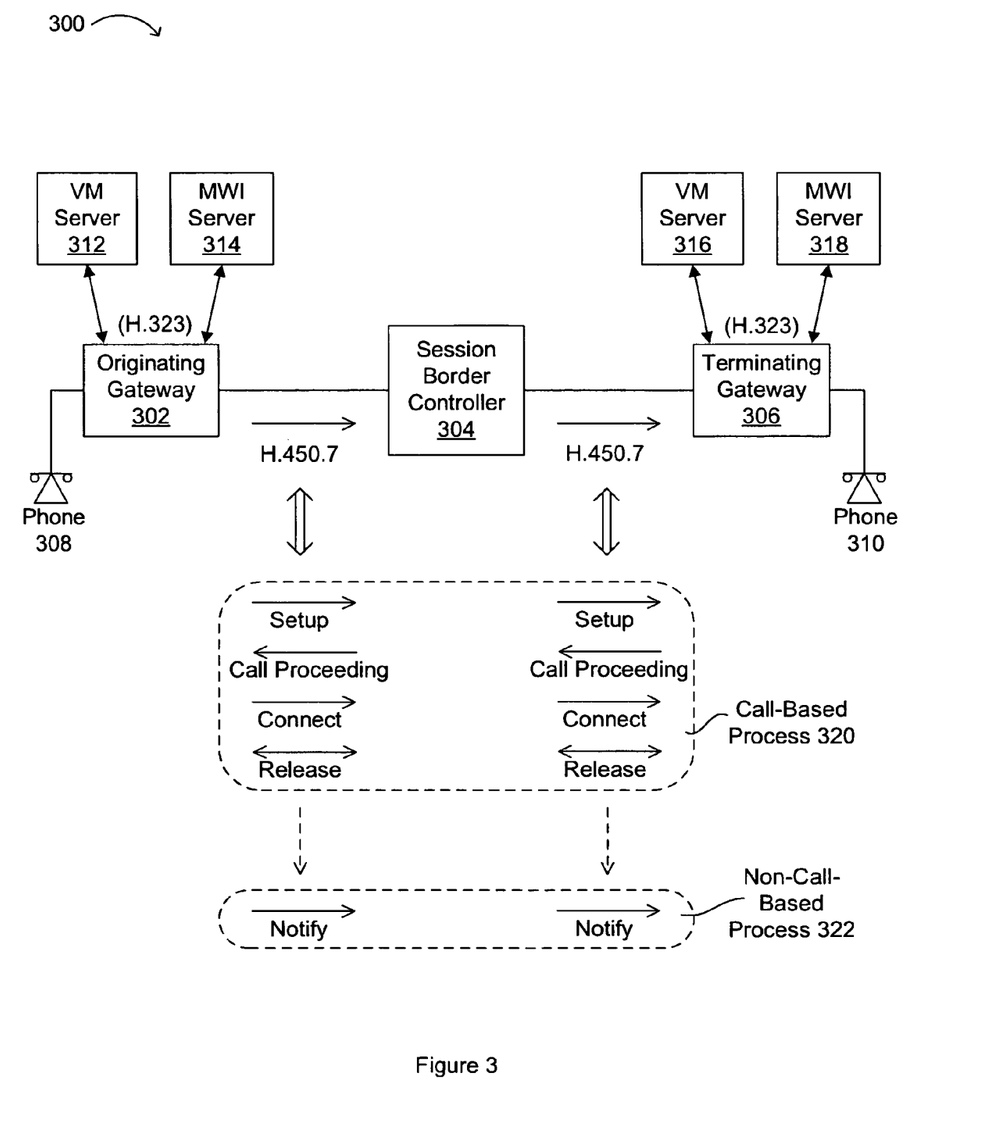
FIG. 3 depicts an exemplary non-call-based H.323 MWI approach in accordance with embodiments of the present invention.

Referring now to FIG. 3, an exemplary non-call-based H.323 MWI approach in accordance with embodiments of the present invention is shown and indicated by the general reference character 300. Phone 308 can connect to originating gateway 302, which can be configured for H.323 protocol. Similarly, phone 310 can connect to H.323 configured terminating gateway 306. Further, originating gateway 302 can have Voicemail (VM) server 312 and MWI server 314 coupled thereto. Similarly, terminating gateway 306 can have VM server 316 and MWI server 318 coupled thereto. Alternatively, VM server 312, MWI server 314, VM server 316, and/or MWI server 318 may be included within its associated gateway (e.g., originating gateway 302 or terminating gateway 306).

Typical existing H.323 type network MWI messages are supported based on H.450.7 standards. In the H.450.7 standard, messages sent can include MWI Activate, MWI Deactivate, and MWI Interrogate, for example. These messages can be passed as part of the establishment of a signaling-only call. A signaling-only call differs from a typical voice call in that the signaling-only call does not send any associated media information and/or media content.

Such a signaling-only call-based process or mechanism 320 is shown in FIG. 3. A call-based mechanism can include a setup, call proceeding, connect, and release. In this particular example, setup can be sent from MWI server 314 to originating gateway 302, and from session border controller (SBC) 304 to terminating gateway 306. Call proceeding can be sent back from terminating gateway 306 via SBC 304 to MWI server 314 (via originating gateway 302). Connect can then be sent to MWI server 318 via SBC 304. Finally, release can be returned from MWI server 318 and terminating gateway 306. Such call-based processes typically include information (e.g., call identification (ID) and globally unique identifier (GUID)) that must be parsed by the system.

However, in accordance with embodiments of the present invention, there is no need to establish such a call in order to send a message waiting indicator (MWI). Non-call-based process or mechanism 322 can replace the call-based approach (e.g., 320) by merely providing "Notify" messages (i.e., H.323 compatible Notify messages, as opposed to SIP Notify or Unsolicited Notify messages) between the appropriate MWI server (e.g., MWI server 314 and/or MWI server 318) and gateways (e.g., originating gateway 302 and/or terminating gateway 306). This non-call-based signaling approach is suitable for an H.323 protocol and can reduce the overhead associated with call establishment. Such overhead may include call detail record (CDR) generation where, since there is no actual media information sent in a signaling-only call, the CDR would be of zero duration for MWI calls.

Advantages of this approach include bandwidth and CPU savings, so these resources can be re-allocated to some other call. Generally, a call contains certain embedded information, such as MWI, as discussed above. According to embodiments of the present invention, a gateway (e.g., originating gateway 302 or terminating gateway 306) can simply update this information without the overhead due to accounting for an actual call. Of perhaps thousands of calls in a system, maybe up to, or possibly more than, 2% may currently have MWI. While this may seem like a low number, it can still become a substantial number of calls in many applications. Further, the percentage of calls including MWI is likely to increase rather than decrease in the future due to the prevalence of more remote work situations, necessitating more voicemails in the workplace, as opposed to reaching someone on a first attempt. In addition, simplified MWI handling can also lead to simplified billing operations, as well as reduced bandwidth.

Non-call based process 322 can include sending MWI information without establishing a call between an MWI server (e.g., MWI server 314 and/or MWI server 318) and a gateway (e.g., originating gateway 302 and/or terminating gateway 306). The Notify message sent from an MWI server to a gateway can include a destination number, a number of messages, and activation, and/or a deactivation status, for example. The gateway can then send back an acknowledgement if the message is accepted by the associated MWI server. On the other hand, if the message is rejected, a non-acknowledgement message can be returned.

In one embodiment, an MWI server can be directly reachable from a querying device (e.g., phone 308 or 310) and/or gateway. Further, a gatekeeper (e.g., originating gateway 302 and/or terminating gateway 306) can be used to get information on a location of a destination device (e.g., phone 308 or 310) for the sending of a Notify message, for example. Among the possible advantages of using a non-call based approach in accordance with embodiments of the present invention are a more simplified method, a reduction in processing and/or parsing overhead associated with MWI messages, and the substantial elimination of zero duration calls, as found in conventional MWI messages.

Figure 4:
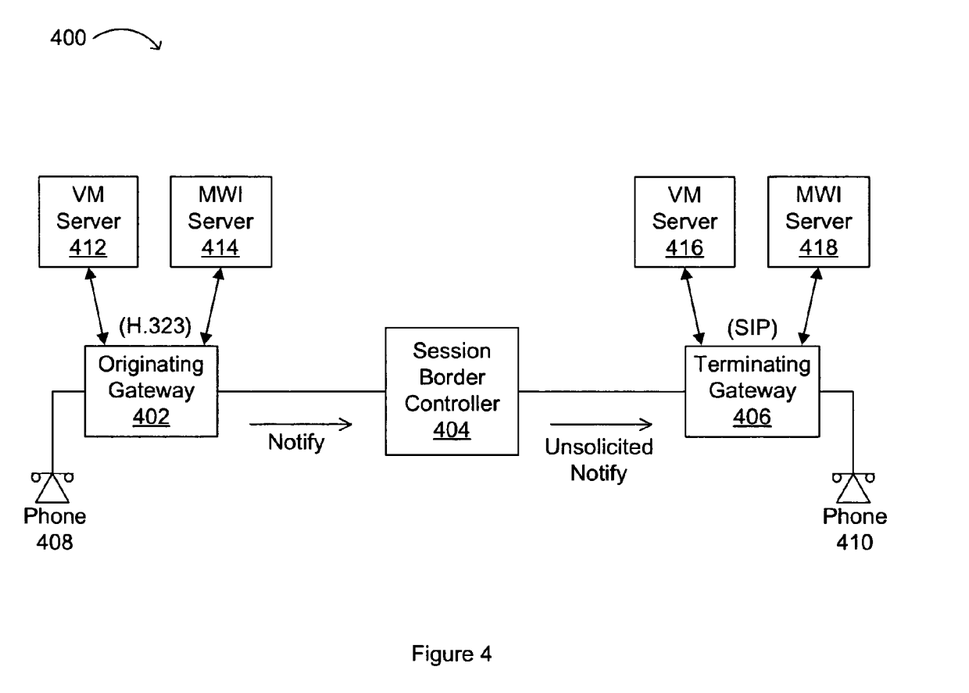
FIG. 4 depicts an exemplary non-call-based MWI approach adapted for use in inter-working between H.323 and SIP protocols in accordance with embodiments of the present invention.

Referring now to FIG. 4, an exemplary non-call-based MWI approach adapted for use in inter-working between H.323 and SIP protocols in accordance with embodiments of the present invention is shown and indicated by the general reference character 400. This method as generally shown in FIG. 4 can be used for translation of an MWI from an H.323 protocol to an SIP protocol, and vice versa. In this case, a "Notify" (i.e., an H.323 Notify) becomes an "Unsolicited Notify" (i.e., a SIP Notify) that is consistent with the SIP format. Or, an "Unsolicited Notify" from SIP can be translated into a "Notify" that is consistent with an H.323 format, for example.

In the example of FIG. 4, originating gateway 402 may be an H.323 configured system that can connect to phone 408, VM server 412, and MWI server 414. A path of a Notify message can be from MWI server 412 to SBC 404. Because terminating gateway 406 is an SIP configured system in this particular example, a path of an Unsolicited Notify message can be from SBC 404 to MWI server 418. SBC 404 can essentially translate or convert the Notify message suitable for an H.323 environment to an Unsolicited Notify message that can be understood by the SIP environment. Accordingly, phone 410 can receive an MWI from MWI server 418 via terminating gateway 406. The associated voicemail message itself can be stored in VM server 416, for example.

Alternatively, a mapping could be done from SIP configured messages to H.323 messages. For example, Unsolicited Notify messages can be sent by a SIP MWI server (e.g., MWI sever 414, if so configured) to SBC 404. SBC 404 can then translate the received Unsolicited Notify message into a Notify message on the H.323 side. Similarly, a Notify message on the H.323 side can be translated into an Unsolicited Notify message on the SIP side by SBC 404. Accordingly, SBC 404 can be configured to translate messages between H.323 and SIP formats in a simplified manner, providing reduced overhead in translating non-call-based SIP messages from/to those that are typically call-based H.323 messages.

As one skilled in the art will recognize, VM server 412 and/or MWI server 414 may be included in originating gateway 402. Similarly, VM server 416 and/or MWI server 418 may be included in terminating gateway 406. Also, while the example of FIG. 4 illustrates an H.323 to SIP conversion, conversions between other protocols and/or for other types of signaling indications can also be accomplished in accordance with embodiments of the present invention.

Figure 5:
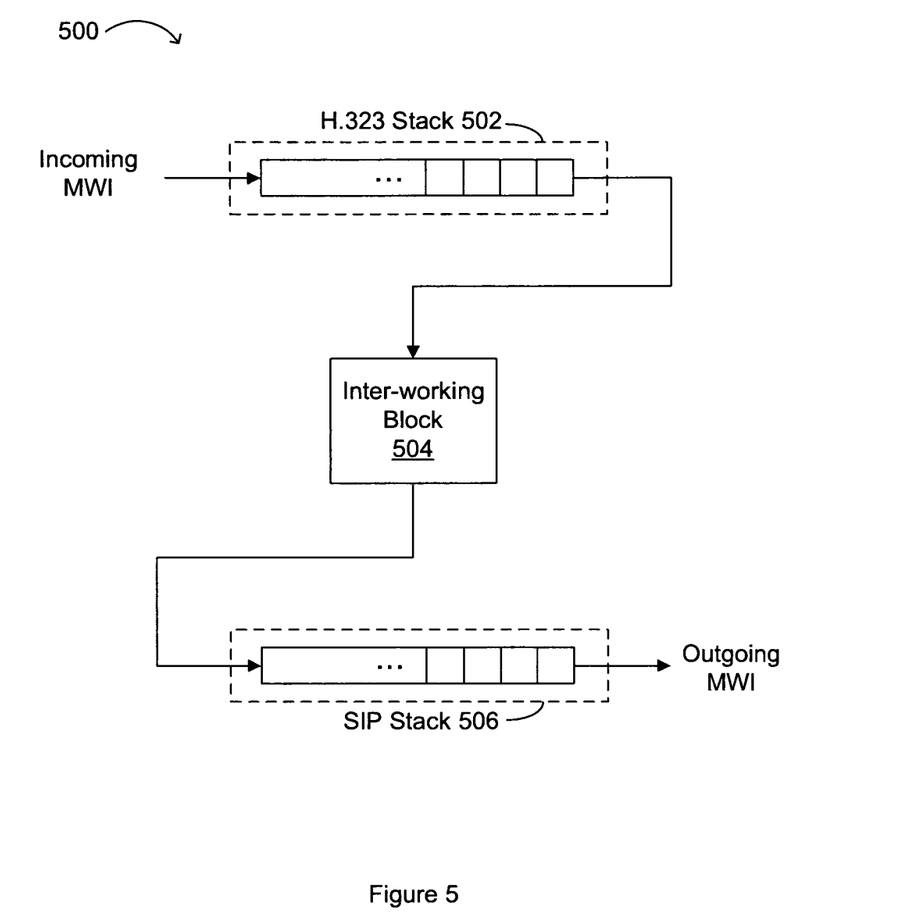
FIG. 5 depicts an exemplary H.323/SIP MWI inter-working stack approach in accordance with embodiments of the present invention.

Referring now to FIG. 5, an exemplary H.323/SIP MWI inter-working stack approach in accordance with embodiments of the present invention is shown and indicated by the general reference character 500. An incoming MWI that is consistent with an H.323 format can be placed on H.323 stack 502. Once an MWI passes through the stack, inter-working block 504 can receive that MWI. Inter-working block 504 can be a router or a server (e.g., a session border controller) that is configured with software to convert from an MWI in one protocol to an MWI in a different protocol. In this example, inter-working block 504 can convert from an MWI understood in H.323 format to an MWI understood in SIP format.

Once the message or MWI is converted from H.323 to SIP format, the translated MWI can be placed on SIP stack 506. When passed through SIP stack 506, the translated MWI can be provided as an outgoing MWI. The incoming MWI can be received from an originating gateway, the outgoing MWI may be provided to a terminating gateway, and the inter-working block can be a session border controller (e.g., originating gateway 402, terminating gateway 406, and SBC 404 of FIG. 4, respectively).

Figure 6:
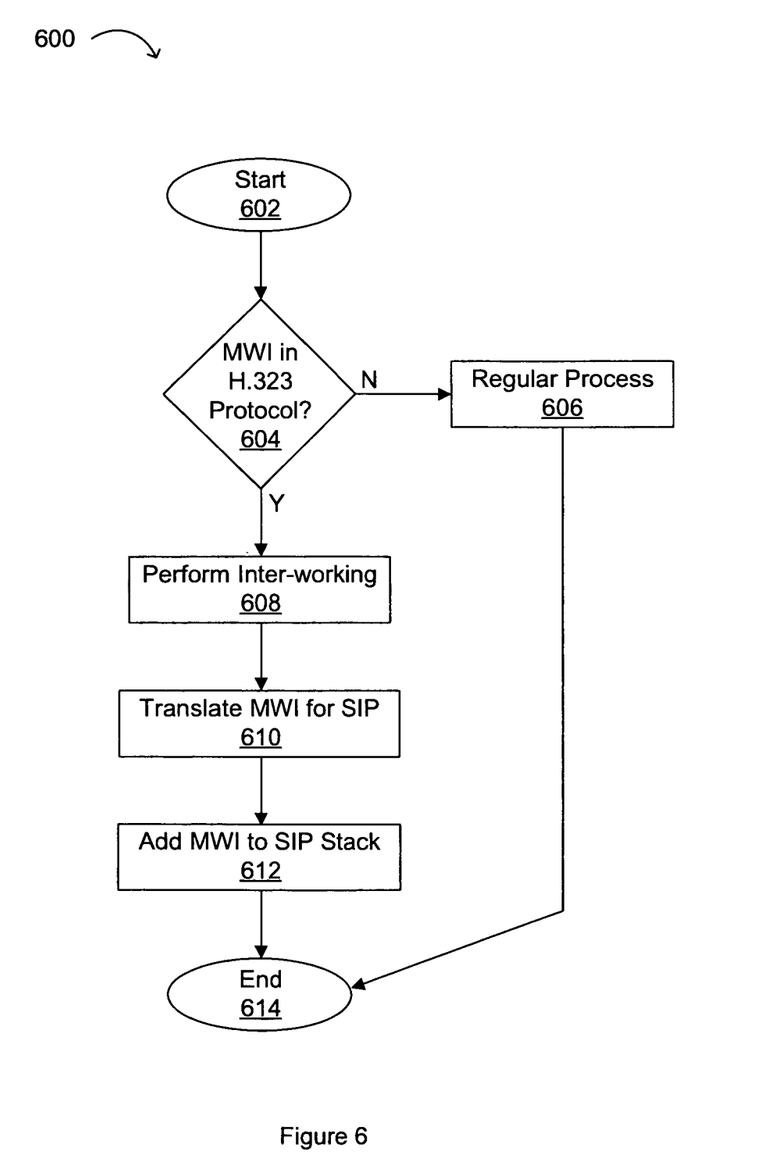
FIG. 6 depicts a simplified flow chart of a method for translating between an MWI in H.323 and an MWI in SIP in accordance with embodiments of the present invention.

Referring now to FIG. 6, a simplified flow chart of a method for translating between an MWI in H.323 and an MWI in SIP in accordance with embodiments of the present invention is shown and indicated by the general reference character 600. The flow can begin (602) and an MWI can be tested to determine if the MWI is in the H.323 protocol. If the MWI is not in the H.323 protocol (604), the regular process (606) can be followed in this particular example. If the MWI is in the H.323 protocol (604), an inter-working can be performed (608). As discussed above, such inter-working can be performed in an SBC or a router and/or server configured to operate as an SBC. As a part of or following the inter-working (608), the MWI can be translated into an appropriate format for SIP (610). Next, the translated MWI can be placed on the SIP stack (612) and the flow can complete (614).

Although MWI translation between H.323 and SIP are primarily described, it will be understood that other types of indicators and/or protocols may be appreciated by persons skilled in the art. For example, any type of indicator suitable for adaptation across multiple system boundaries can be accommodated in accordance with embodiments. Further, other VOIP or other communication protocols can be employed in accordance with embodiments. For example, other variations of H.323 protocol (e.g., H.32X) can be utilized in accordance with embodiments.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   receiving, via an originating gateway, a H.323 notify message at a session border controller (SBC) from a first server, the H.323 message including at least a destination number and a deactivation status of the first server, wherein the first server and the originating gateway operate in H.323 protocol;
   determining that the H.323 notify message is sent, using non-call based signaling, between the first server and the originating gateway;
   placing the H.323 notify message in an H.323 stack;
   in response to placing the H.323 notify message in the H.323 stack, retrieving the H.323 notify message from the H.323 stack and converting the H.323 notify message into a session initiation protocol (SIP) notify message using an inter-working block in the SBC;
   placing the SIP notify message in an SIP stack;
   receiving data indicating that message waiting indicator (MWI) information from the first server is sent to a second server via the conversion from the H.323 notify message to the SIP notify message; and
   in response to placing the SIP notify message in the SIP stack, retrieving the SIP notify messages from the SIP stack and sending the SIP notify message to the terminating gateway for sending to the second server, and wherein the H.323 notify message includes at least, a number of messages, and an activation status, and the SIP notify message is an Unsolicited Notify message.

2. The method of claim 1, wherein the H.323 notify message is an H.450.7 compatible message.

3. The method of claim 1, wherein the SBC is a router that is configured by software to perform the converting.

4. An apparatus comprising:
   one or more processors; and
   logic encoded in one or more tangible media for execution by the one or more processors, and when executed operable to perform:
      receiving, via an originating gateway, a H.323 notify message from a first server, the H.323 notify message including at least a destination number and a deactivation status of the first server, wherein the first server and the originating gateway operate in H.323 protocol;
      determining that the H.323 notify message is sent, using non-call based signaling, between the first server and the originating gateway;
      placing the H.323 notify message in an H.323 stack;
      in response to placing the H.323 notify message in the H.323 stack, retrieving the H.323 notify message from the H.323 stack and converting the H.323 notify message into a session initiation protocol (SIP) notify message using an inter-working block;
placing the SIP notify message in an SIP stack;
receiving data indicating that message waiting indicator (MWI) information from the first server is sent to a second server via the conversion from the H.323 notify message to the SIP message based on determining that the H.323 protocol notify message is sent; and
in response to placing the SIP notify message in the SIP stack, retrieving the SIP notify messages from the SIP stack and sending the SIP notify message to the terminating gateway for sending to the second server, wherein the H.323 notify message includes at least, a number of messages, and an activation status, and the SIP notify message is an Unsolicited Notify message.

5. The apparatus of claim 4, wherein the H.323 notify message is an H.450.7 compatible message.

6. The apparatus of claim 4, wherein at least one of the first and second networks includes a service provider (SP) network.

7. A method comprising:
receiving, via a first gateway, a session initiation protocol (SIP) notify message at a session border controller (SBC) from a first server, the first server and the first gateway operating in SIP protocol;
determining that the SIP notify message is sent, using non-call based signaling, between the first server and the first gateway;
placing the SIP notify message in an SIP stack;
in response to placing the SIP notify message in the SIP stack, retrieving the SIP notify message from the SIP stack and converting the SIP notify message into an H.323 notify message using an inter-working block in the SBC;
placing the H.323 notify message in an H.323 stack;
receiving data indicating that message waiting indicator (MWI) information from the first server is sent to a second server via the conversion from the SIP notify message to the H.323 notify message; and
in response to placing the H.323 notify message in the H.323 stack, retrieving the H. 323 notify messages from the H.323 stack and sending the H.323 notify message to a second gateway for sending to the second server, wherein the second gateway and the second server are operating in H.323 protocol and the H.323 notify message includes at least a destination number and a deactivation status of the first server, and wherein the H.323 notify message further includes at least, a number of messages, and an activation status, and the SIP notify message is an Unsolicited Notify message.

8. The method of claim 7, wherein the H.323 notify message is an H.450.7 compatible message.

9. The method of claim 7, wherein the SBC is a router that is configured by software to perform the converting.

* * * * *